(12) United States Patent
Perez et al.

(10) Patent No.: US 11,676,483 B2
(45) Date of Patent: *Jun. 13, 2023

(54) SYSTEM AND METHOD FOR FACILITATING APPLIANCE CONTROL VIA A SMART DEVICE

(71) Applicant: Universal Electronics Inc., Scottsdale, AZ (US)

(72) Inventors: Jesus Perez, Fontana, CA (US); Joven Jubilo, Anaheim, CA (US); Rex Xu, Tustin, CA (US); Jeffrey Kohanek, Westminster, CA (US); Brandt Thompson, Newport Coast, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/834,662

(22) Filed: Jun. 7, 2022

(65) Prior Publication Data

US 2022/0301417 A1 Sep. 22, 2022

Related U.S. Application Data

(63) Continuation of application No. 17/126,731, filed on Dec. 18, 2020, now Pat. No. 11,398,148, which is a
(Continued)

(51) Int. Cl.
*H04M 1/72415* (2021.01)
*G08C 23/04* (2006.01)
*G08C 17/02* (2006.01)

(52) U.S. Cl.
CPC ............ *G08C 17/02* (2013.01); *G08C 23/04* (2013.01); *H04M 1/72415* (2021.01);
(Continued)

(58) Field of Classification Search
CPC ............ G08C 2201/09; G08C 2201/40; H04N 2005/442; H04N 21/4126
See application file for complete search history.

(56) References Cited

U.S. PATENT DOCUMENTS

| 6,724,339 B2 | 4/2004 | Conway et al. |
| 6,980,150 B2 | 12/2005 | Conway, Jr. et al. |

(Continued)

FOREIGN PATENT DOCUMENTS

WO 89/11137 A1 11/1989

OTHER PUBLICATIONS

European Patent Office, Extended European Search Report issued on European patent application No. 12765455.6, dated Aug. 5, 2014, 9 pages.
(Continued)

*Primary Examiner* — Curtis A Kuntz
*Assistant Examiner* — Jerold B Murphy
(74) *Attorney, Agent, or Firm* — Greenberg Traurig, LLP

(57) ABSTRACT

A bridge device, in communication with a smart device, functions to command one or more controllable appliances in response to communications received from the smart device. The bridge device also includes input elements by which the bridge device can be used to directly command common functional operations of the one or more controllable appliances. In this manner, common functional operations, such as volume control, playback pause/resume control, etc., may be made readily available without necessitating the use of the smart device, whilst the more sophisticated GUI provided by the smart device remote control app may be advantageously utilized when more complex or less frequently used command functions are to be performed.

19 Claims, 6 Drawing Sheets

Related U.S. Application Data continuation of application No. 15/832,268, filed on Dec. 5, 2017, now Pat. No. 10,902,716, which is a continuation of application No. 13/071,661, filed on Mar. 25, 2011, now Pat. No. 9,852,615.

(52) U.S. Cl.
CPC ..... *G08C 2201/40* (2013.01); *G08C 2201/92* (2013.01); *G08C 2201/93* (2013.01); *H04M 2250/22* (2013.01)

(56) References Cited

U.S. PATENT DOCUMENTS

| | | | |
|---|---|---|---|
| 8,508,401 B1 | 8/2013 | Patel et al. | |
| 8,509,400 B2 | 8/2013 | Liu et al. | |
| 9,852,615 B2* | 12/2017 | Perez | G08C 17/02 |
| 10,902,716 B2* | 1/2021 | Perez | G08C 17/02 |
| 11,398,148 B2* | 7/2022 | Perez | H04M 1/72415 |
| 2003/0103088 A1 | 6/2003 | Dresti et al. | |
| 2003/0122698 A1 | 7/2003 | Horie et al. | |
| 2004/0203387 A1 | 10/2004 | Grannan | |
| 2005/0159823 A1 | 7/2005 | Hayes et al. | |
| 2008/0044006 A1 | 2/2008 | Kitagawa | |
| 2009/0092397 A1 | 4/2009 | Taguchi | |
| 2009/0113478 A1 | 4/2009 | Haughawout et al. | |
| 2009/0115723 A1 | 5/2009 | Henty | |
| 2009/0121905 A1 | 5/2009 | Griffen, Jr. et al. | |
| 2009/0239587 A1 | 9/2009 | Negron et al. | |
| 2010/0182236 A1 | 7/2010 | Pryor | |
| 2012/0084662 A1 | 4/2012 | Navarro et al. | |

OTHER PUBLICATIONS

The Int. Bureau of WIPO, Preliminary Report on Patentability issued on PCT/US12/027841, dated Oct. 10, 2013, 7 pgs.

* cited by examiner

SYSTEM AND METHOD FOR FACILITATING APPLIANCE CONTROL VIA A SMART DEVICE

RELATED APPLICATION INFORMATION

This application claims the benefit of and is a continuation of U.S. application Ser. No. 17/126,731, filed on Dec. 18, 2020, which application claims the benefit of and is a continuation of U.S. application Ser. No. 15/832,268, filed on Dec. 5, 2017, which application claims the benefit of and is a continuation of U.S. application Ser. No. 13/071,661, filed on Mar. 25, 2011, the disclosures of which are incorporated herein by reference in their entirety.

BACKGROUND

Personal communication, productivity, and entertainment devices such as cellular phones, PDAs, portable email devices, tablet computers, e-books, hand-held games, portable media players, etc. (all referred to hereafter as "smart devices") are known to include features such as graphical user interfaces on color touch screens, Bluetooth and/or WiFi capability, etc. Increasingly, such smart devices also incorporate support for ancillary applications (hereafter referred to as "apps") for example calendars, email, maps and navigation, etc. Such ancillary applications may be pre-installed in a smart device or may be made available for download by a user. Certain apps may comprise an ability to issue commands to entertainment and other appliances, for example in conjunction with a GUI offering the features and functionality of a universal remote control, as a user convenience in conjunction with a TV guide display to enable channel selection, etc.

In order to effect such control functionality, it is known in the art to provision a smart device with hardware and/or firmware suitable for the generation of appliance command signals. Provision of such hardware and/or firmware may be internal, i.e. built into a smart device; may be external, i.e., in the form of add-on attachments to a smart device; or may be discrete, i.e., in the form of a separate self-contained unit which receives wireless signals from a smart device and converts them to appropriate appliance command transmissions.

SUMMARY OF THE INVENTION

This invention relates generally to systems and methods for equipping a smart device with appliance command functionality, and in particular to the provision of a discrete device for receiving and converting appliance command requests from a smart device, which discrete device may also include the ability to directly issue appliance commands in response to user input.

It is known in the art to provide a self-contained bridge device, comprising for example a receiver, a processing/translation means, and a transmitter, which bridge device is capable of receiving generic appliance command requests from a smart device via, for example, an RF link such as Bluetooth or WiFi and translating these command requests into appliance-recognizable transmissions, these transmissions usually (but not necessarily) taking the form of infrared ("IR") encoded signals which may emulate a target appliance's original equipment remote control. The availability of such bridge devices greatly facilitates the deployment of remote control apps for smart devices, since apps intended for use in conjunction with bridge devices may then comprise a simple software GUI with no requirement for additional hardware or firmware installed onto or built into the target smart device.

However, the use of smart device apps for appliance control, with or without prior art bridge units as described above, may remain less than optimal in many environments. Since a smart device, particularly a smart phone, is essentially a personal device, it may not be readily available for communal use when several persons are present in the environment to be controlled, for example a family watching TV in the home. Furthermore, minor equipment adjustments which necessitate repeated activation of a smart device remote control app, for example such as may occur each time a TV commercial airs and audio volume needs to be adjusted, may constitute a considerable inconvenience to the owner of the smart device.

The improvement presented herein addresses these and other shortcomings. An inventive bridge unit provides the RF reception and command translation functionality of prior art units while additionally accepting direct control inputs for a limited number of commonly used appliance command functions. These direct control inputs may take the form of pushbuttons, knobs, touchpads, etc., located on the physical bridge unit itself, which unit may be designed to be placed in the environment at an easily accessible location such as, for example, on a coffee table. In this manner, commonly used adjustments such as volume or muting, playback pause/resume, etc. may be made readily available without necessitating the use of a smart device, whilst the more sophisticated GUI provided by a smart device remote control app may be advantageously utilized when more complex or less frequently used command functions are to be performed, and/or where appliance or media control is a feature of the app, for example when implementing functionality such as described in co-pending U.S. patent application Ser. No. 12/327,875 "System and Method for Interacting with a Program Guide Displayed on a Portable Electronic Device" or Ser. No. 12/761,161 "System and Methods for Enhanced Metadata Entry" both of common ownership and both incorporated herein by reference in their entirety.

A better understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention, reference may be had to preferred embodiments shown in the attached drawings in which.

DETAILED DESCRIPTION

Figure 1:
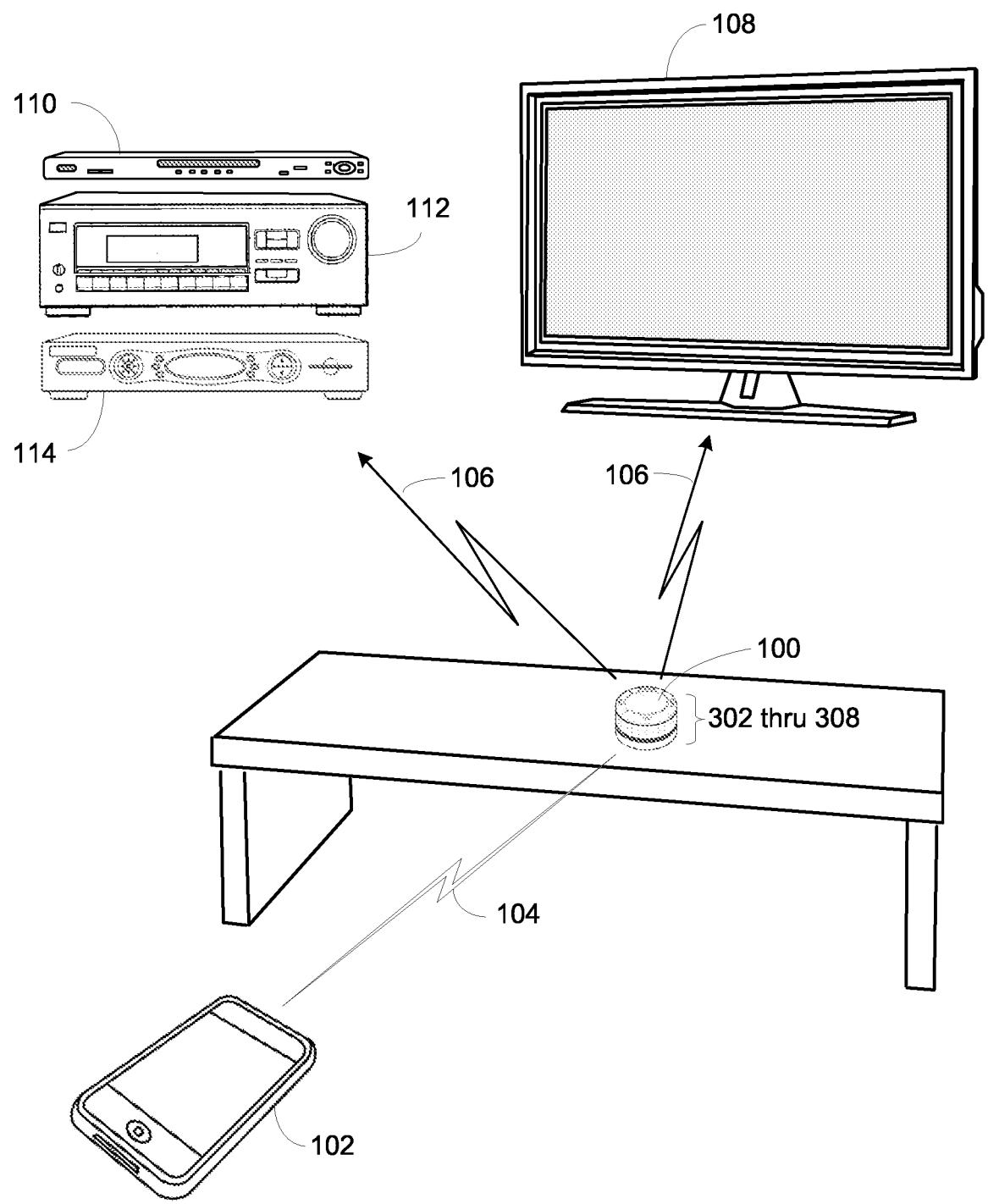
FIG. 1 illustrates an exemplary system in which an exemplary bridge device in accordance with the instant invention may be used alone and/or in conjunction with a smart device as a controlling device.

Turning now to FIG. 1, there is illustrated an exemplary system in which a smart device, such as a smart phone 102, may be adapted to control various controllable appliances, such as a television 108, a cable set top box combined with a digital video recorder ("DVR") 114, an AV receiver 112, and a DVD payer 110. Transmission of commands to the appliances may be facilitated by a combination command input and bridge device 100, which when functioning as a bridge device may receive wireless signals 104 from an app resident in smart phone 102 and convert these to appropriate infrared ("IR") signals 106 recognizable by the target appliances, and when functioning as a command input device may accept user mechanical input via one or more knobs or switches and likewise convert these inputs to appropriate IR signals 106; all to cause the appliances to perform one or more operational functions. While illustrated in the context of a television 108, DVR 114, AV receiver 112, and DVD player 110 it is to be understood that controllable appliances may include, but need not be limited to, televisions, VCRs, DVRs, DVD players, cable or satellite converter set-top boxes ("STBs"), amplifiers, CD players, game consoles, home lighting, drapery, fans, HVAC systems, thermostats, personal computers, etc. Also, while illustrated in the context of IR command transmissions, it will be appreciated that in general, command transmissions by bridge device 100 may take the form of any convenient IR, RF, hardwired, point-to-point, or networked protocol, as necessary to cause the respective target appliances to perform the desired operational functions. Further, while communications 104, 106, etc., between exemplary devices are illustrated herein as direct links, it should be appreciated that in many instances such communication may take place via a local area network or personal area network, and as such may involve various intermediary devices such as routers, access points, etc. Since these items are not necessary for an understanding of the instant invention, they are omitted from the Figures for the sake of clarity.

Figure 2:
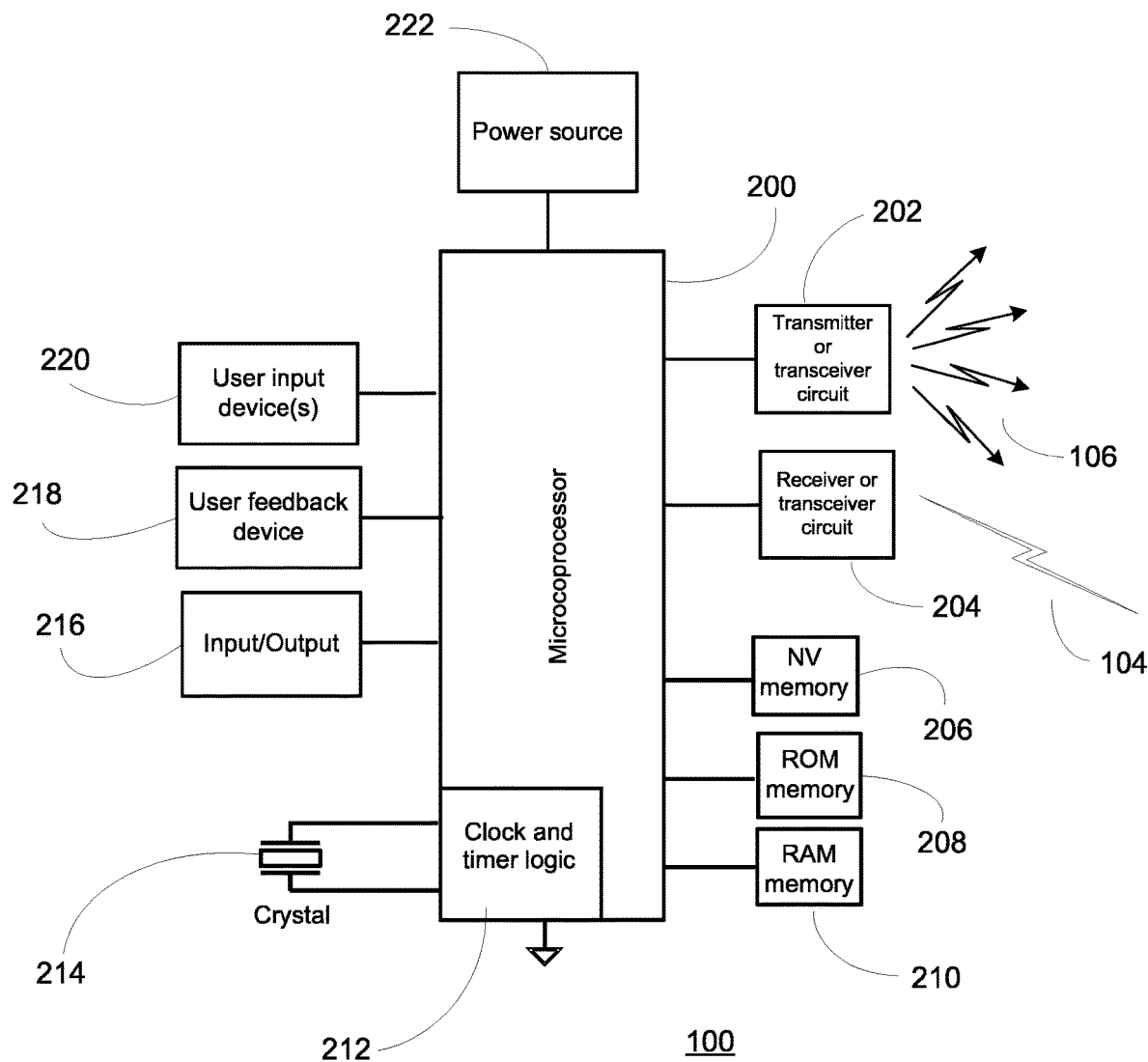
FIG. 2 illustrates in block diagram form the major components of the exemplary bridge device of FIGS. 1 and 3.

With reference to FIG. 2, for use in commanding the functional operations of one or more appliances, an exemplary bridge device 100 may include, as needed for a particular application, a processor 200 coupled to a ROM memory 208; a RAM memory 210; a non-volatile read/write memory 206; user input means 220 such as hard keys, soft keys on a touch sensitive surface, knobs, sliders, etc.; transmission circuit(s) and/or transceiver circuit(s) 202 (e.g., IR and/or RF) for issuance of commands to controlled appliances; receiver and/or transceiver circuit(s) 204 for receipt of command requests, e.g., from a smart phone 102; means 218 to provide feedback to the user (e.g., one or more LEDs, illuminable keys, display, speaker, and/or the like); an input/output port 216 such as a serial interface, USB port, modem, Zigbee, WiFi, or Bluetooth transceiver, etc.; a power source 220 such as a battery or a mains power adapter; and clock and timer logic 212 with associated crystal or resonator 214.

As will be understood by those skilled in the art, some or all of the non-transient, physically embodied memories 206, 208, 210 may include executable instructions (collectively, the bridge device program memory) that are intended to be executed by the processor 200 to control the operation of the bridge device 100, as well as data which serves to define the necessary control protocols and command values for use in transmitting command signals to controllable appliances (collectively, the command data). In this manner, the processor 200 may be programmed to control the various electronic components within the controlling device 100, e.g., to monitor the input means 220 and request receiver 204, to cause the transmission of appliance command signals, etc. The non-volatile read/write memory 206, for example an EEPROM, battery-backed up RAM, FLASH, Smart Card, memory stick, or the like, may additionally be provided to store setup data and parameters as necessary. While the memory 208 is illustrated and described as a ROM memory, memory 208 can also be comprised of any type of readable media, such as ROM, FLASH, EEPROM, or the like. Preferably, the memories 206 and 208 are non-volatile or battery-backed such that data is not required to be reloaded after battery changes. In addition, the memories 206, 208 and 210 may take the form of a chip, a hard disk, a magnetic disk, an optical disk, and/or the like. Still further, it will be appreciated that some or all of the illustrated memory devices may be physically combined (for example, a single FLASH memory may be logically partitioned into different portions to support the functionality of memories 206 and 208 respectively), and/or may be physically incorporated within the same IC chip as the microprocessor 200 (a so called "microcontroller") and, as such, they are shown separately in FIG. 2 only for the sake of clarity.

To cause the bridge device 100 to perform an action, the bridge device 100 may be adapted to be responsive to events, such as a sensed user interaction with input means 220, receipt of a request from a smart phone 102, etc. In response to an event, appropriate instructions within the program memory (hereafter the "bridge device operating program") may be executed. For example, when a command request is received from a smart phone 102, the bridge device 100 may retrieve from the command data stored in memory 206, 208, 210 a command value and control protocol corresponding to the requested function and device and transmit that command to an intended target appliance, e.g., TV 108, in a format recognizable by that appliance to thereby control one or more functional operations of that appliance.

Bridge device 100 may comprise a universal controller, that is a device provisioned with a command data library which encompasses a multiplicity of command codes and protocols suitable for controlling appliances of various different model and manufacture. The library of command data may represent a plurality of controllable appliances of different types and manufacture, a plurality of controllable appliances of the same type but different manufacture, a plurality of appliances of the same manufacture but different type or model, etc., or any combination thereof as appropriate for a given embodiment. In all such cases, for selecting sets of command data to be associated with the specific appliances to be controlled (hereafter referred to as a setup procedure), data may be provided to the bridge device 100 that serves to identify each intended target appliance by its make, and/or model, and/or type. Such setup data allows the bridge device 100 to identify the appropriate command data set within the library of command data that is to be used to transmit recognizable commands in formats appropriate for such identified appliances.

The setup procedure for an illustrative bridge device 100 may comprise any method appropriate for a particular embodiment. For example, a setup procedure may entail one or more of: manipulating user input means 220 such as activating pre-defined combinations of buttons or other controls; performing configuration selection using an external system such as a PC or DVR 114 and downloading the resultant setup data to bridge device 100 via, for example, a USB port 216 or wirelessly via a WiFi or Bluetooth transceiver 204; executing a setup app on smart phone 102 and wirelessly transferring setup data as above; etc. Additionally, in some embodiments all or part of the required command data library may be downloaded into bridge device 100 as part of the set up process, originating for example from a local database resident in DVR 114 or smart phone 102 (i.e., stored in conjunction with a smart phone app), or from a remote Internet server based database accessed either directly by bridge device 100 or by using DVR 114 or smart phone 102 as an intermediary. Further, PC, DVR or smart phone based set up application processes may be local, Web server based, or a combination thereof as appropriate for a particular embodiment. Since systems and methods for setting up a universal controlling device to command the operation of specific home appliances are well-known, these will not be described in greater detail herein. Nevertheless, for additional information pertaining to setup procedures, the reader may turn, for example, to U.S. Pat. Nos. 4,959, 810, 5,872,562, 7,653,212, or 7,612,685, all of which are incorporated herein by reference in their entirety.

Figure 3:
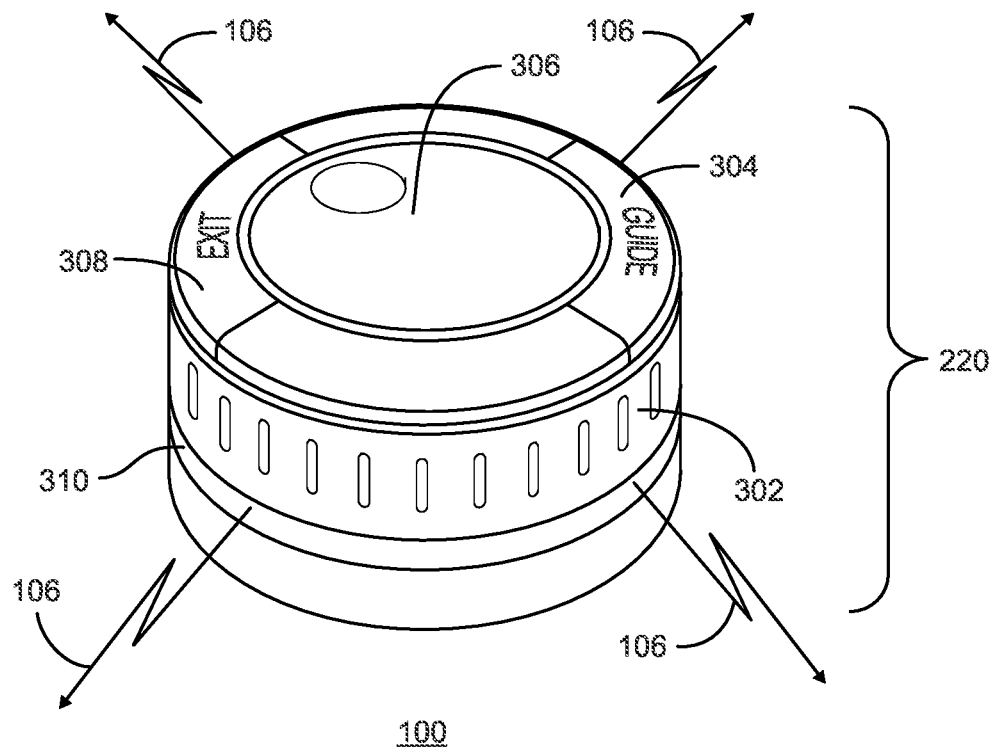
FIG. 3 further illustrates the exemplary bridge device of FIG. 1.
Figure 3:
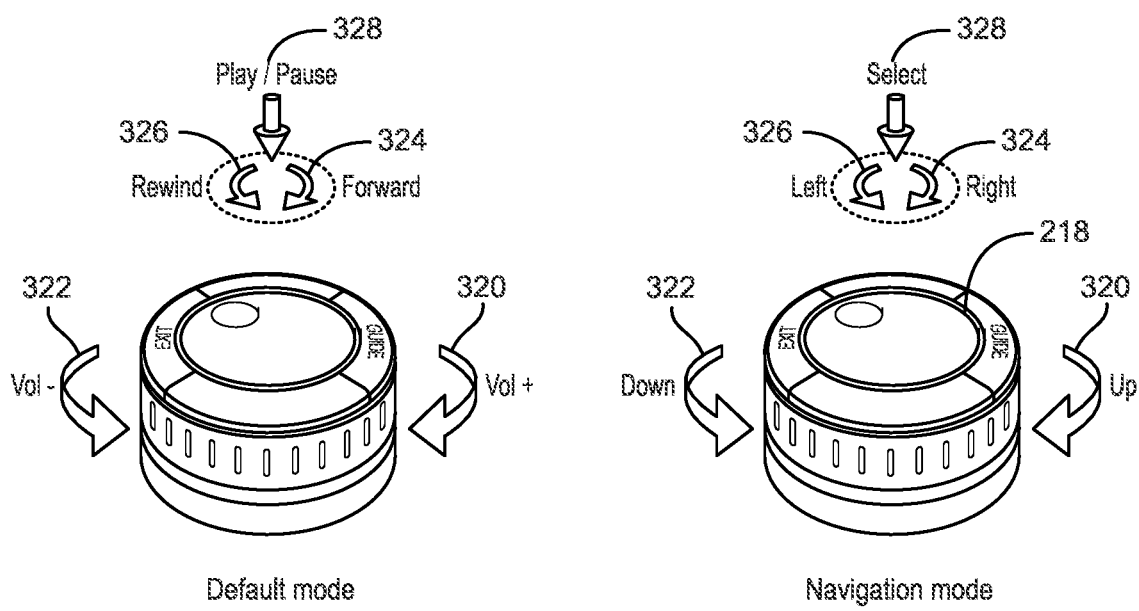

As is known in the art, the bridge device operating program may be adapted to monitor wireless receiver circuit 204 for command request messages originating from a smart phone 102. Upon receipt of such a request, the bridge device operating program may retrieve from the command data stored in memory a command value and control protocol corresponding to the requested function and the identified device and may cause transmitter circuit 202 to output that command in a format recognizable by the target appliance. In accordance with the instant invention, an exemplary bridge device may additionally include means for direct user input on the device itself and further operating programming to monitor such input(s) 220 and output appliance commands in response thereto. With reference now FIG. 3, an illustrative bridge device 100 in accordance with the instant invention may include on its external surface various means for user input comprising buttons 304, 308, a twistable ring 302, and a rotatable wheel 306 which wheel may also function as a button or switch when depressed. In this manner seven distinct user inputs may be supported: three buttons presses, clockwise and anticlockwise ring twists, and clockwise and anticlockwise wheel rotations. As will be appreciated, many other configurations of input mechanisms are possible and accordingly the example presented in FIG. 3 is intended to be illustrative and not limiting. As shown, the exemplary bridge device 100 of FIG. 3 may include multiple IR transmitters arranged around the periphery of bridge device 100 so as to radiate IR signals 106 in multiple different directions, e.g., positioned at 180 degree or 90 degree or 45 degree intervals about the device, thus ensuring that command transmissions are visible to the target appliance(s) regardless of the orientation of bridge device 100. In the illustrative embodiment, for aesthetic reasons and/or for mechanical protection such transmitters may be positioned behind an IR-transparent lens 310 of tinted polycarbonate or acrylic plastic.

In the illustrative embodiment, the operating program of bridge device 100 may comprise two modes for acceptance of direct user interaction: In a default mode of operation, clockwise and anti-clockwise twists 320,322 of outer ring 302 may result in transmission of volume up/down commands to TV 108, while clockwise and anti-clockwise rotations 324,326 of wheel 306 may result in transmission of forward/rewind commands to DVR 114 and depression 328a of wheel 306 may result in transmission of a play/pause command to DVR 114. In this embodiment, activation of button 304 may result in both the transmission of a command to DVR 114 to cause a display of program guide information by DVR 114 and setting bridge device operating program to a navigation mode, wherein user interactions 320 through 328 with ring 302 or wheel 306 may result in transmission of DVR 114 program guide navigation commands up/down, left/right, and select. Activation of either the "select" function 328 of wheel 306 or the "Exit" button 308 may cause transmission of an appropriate command to DVR 114 together with restoration of the bridge device operating program to the default mode. In this manner, the direct commands currently available to a user of the bridge device 100 may be automatically adapted as appropriate to the operational status of a controlled device such as DVR 114. In some embodiments the current operational mode of bridge device 100 may be indicated the user via, for example, a user feedback device 218 comprising an illuminable translucent ring surrounding wheel 306. It will be appreciated that in various embodiments such bridge device mode switching functionality may be supported or supplemented via other means: for example one or more of the controlled devices may communicate current system status directly to bridge device 100, e.g., DVR 114 may indicate a current operational status; TV 108 may indicate a currently selected input to bridge device 100 to allow automatic selection of DVR 114 or DVD 110 at the target appliance for play/pause commands; an app loaded in smart phone 102 may signal a preferred operational mode to a bridge device; etc.

Figure 4:
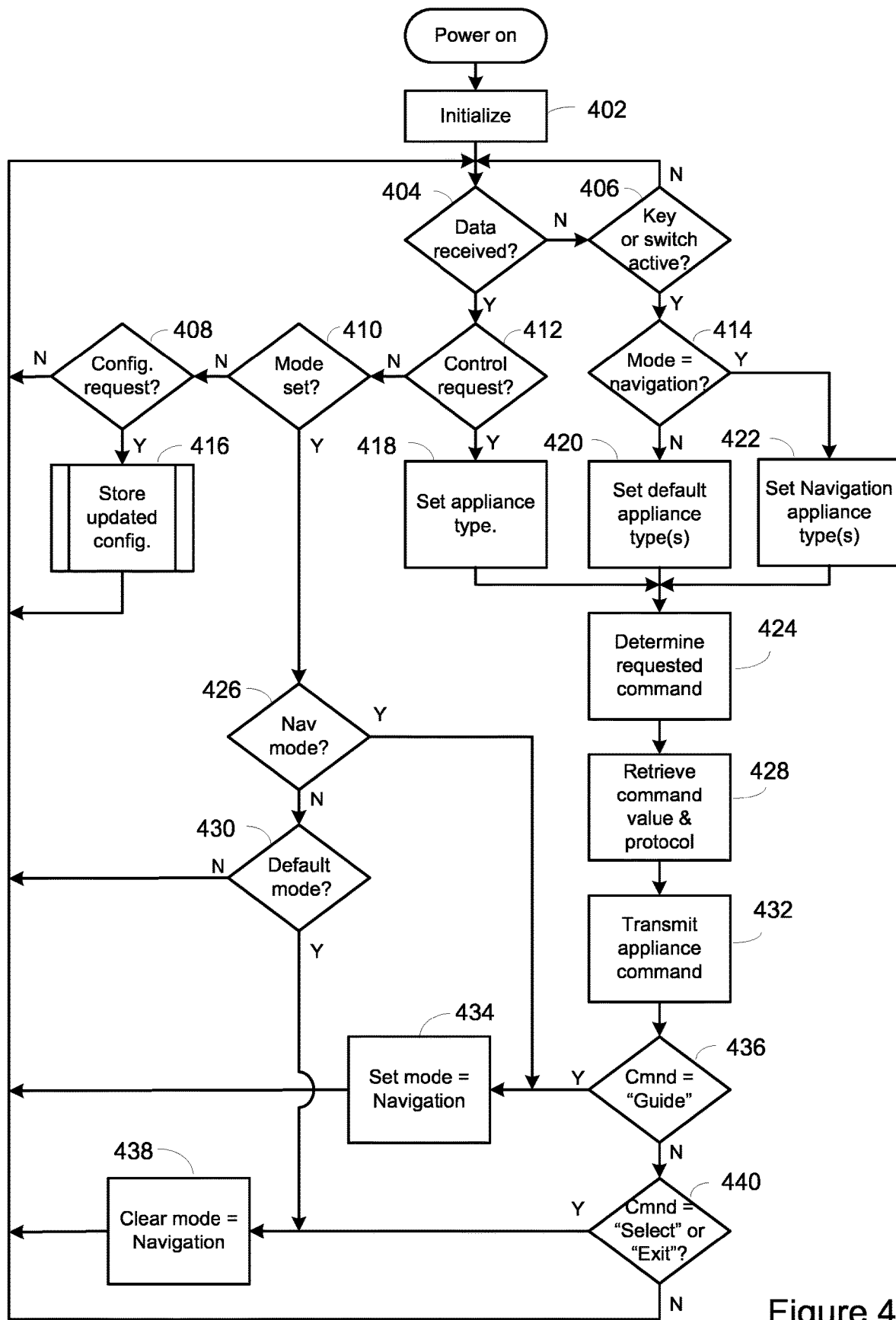
FIG. 4 illustrates an exemplary operational flow as may be implemented in one embodiment of the bridge device of FIGS. 1, 2 and 3.

By way of further example, a series of steps which may be performed by an exemplary bridge device operating program is illustrated in FIG. 4. Upon initial power-up, at step 402 the bridge device operating program may place bridge device 100 into a known initial state, which may include in the example presented setting the initial operational mode to a default value. Thereafter, at steps 404,406 the exemplary bridge device operating program may commence scanning receiver 204 and user input devices 206 (i.e., 302 through 308) for activity. As will be appreciated, in certain embodiments, particularly those in which a bridge device power source 222 is battery-based, such input scanning may not entail active execution of program instructions but may rather comprise placing microprocessor 200 into a low power state pending a wake up interrupt from one or more of these input sources. If user interaction with any of input devices 302 through 308 is detected, at step 414 the exemplary bridge device operating program may first determine the current operating mode of the bridge device, i.e., navigation mode or default mode as described above in connection with FIG. 3. According to this determination, at steps 420 or 422 the appropriate target appliances may be set. For example, as described earlier in conjunction with FIG. 3 if bridge device 100 is operating in default mode the target appliance for ring rotations 320,322 may be TV 108, while if bridge device 100 is operating in navigation mode the target appliance for the same user actions may be DVR 114. As will be appreciated, the exact assignment of appliances to particular modes and to specific user interactions may be configurable and/or dynamic (assigned for example by interaction with appliances themselves to determine which are currently active) and as such, the assignments mentioned herein are by way of example only and not limiting.

Once a target appliance has been determined, at steps 424, 428 and 432 the exemplary bridge device operating program may next determine the desired command (i.e., the action to be performed by the target appliance), retrieve from command data storage the appropriate command value and control protocol for the selected target appliance, and transmit the command in a format recognizable by the appliance to be controlled. Upon completion of these steps, at step 426 the exemplary bridge device operating program may next determine if the command transmitted comprised a "Guide" command (i.e. corresponding to button 304). If so at step 434 the bridge device operational mode is set to "Navigation", thus ensuring that subsequent user interactions with inputs 302 through 308 will be directed to the appliance(s) configured for this mode of operation. If not, at step 440 it is next determined if the command just transmitted was either of "Select" or "Exit" in which case, in keeping with the methodology described above in conjunction with FIG. 3, at step 438 the bridge device operational mode is returned to "Default". Thereafter, processing of the event is complete and receiver and input scanning is resumed.

If receipt of a transmission by receiver 204 is detected, at step 412 the exemplary bridge device operating program may determine if the received transmission comprises an appliance control request, for example from smart phone 102. If so, at step 418 the target appliance type is set as indicated in the received request, and thereafter processing continues at step 424 as described previously. If the received transmission is not a control request, at step 410 it is next determined if this comprises a request to alter the bridge device mode of operation (i.e. the response to user interactions with inputs 302 through 308). This may occur, for example, in embodiments where an appliance such as DVR 114 may explicitly signal operational state to the bridge device. If it is determined that a request to place the bridge device into a specific mode has been received, then appropriate action may be taken by the exemplary bridge device operating program at steps 426 and 430.

Finally, at step 408 it is determined if the received transmission comprises updated bridge device configuration data, such as may for example have been created via a set up app on smart phone 102, a PC or STB based configurator, etc. If so, at step 416 the updated configuration data is stored, for example in non-volatile memory 206, whereafter input event scanning resumes at steps 404 and 406.

Figure 5:
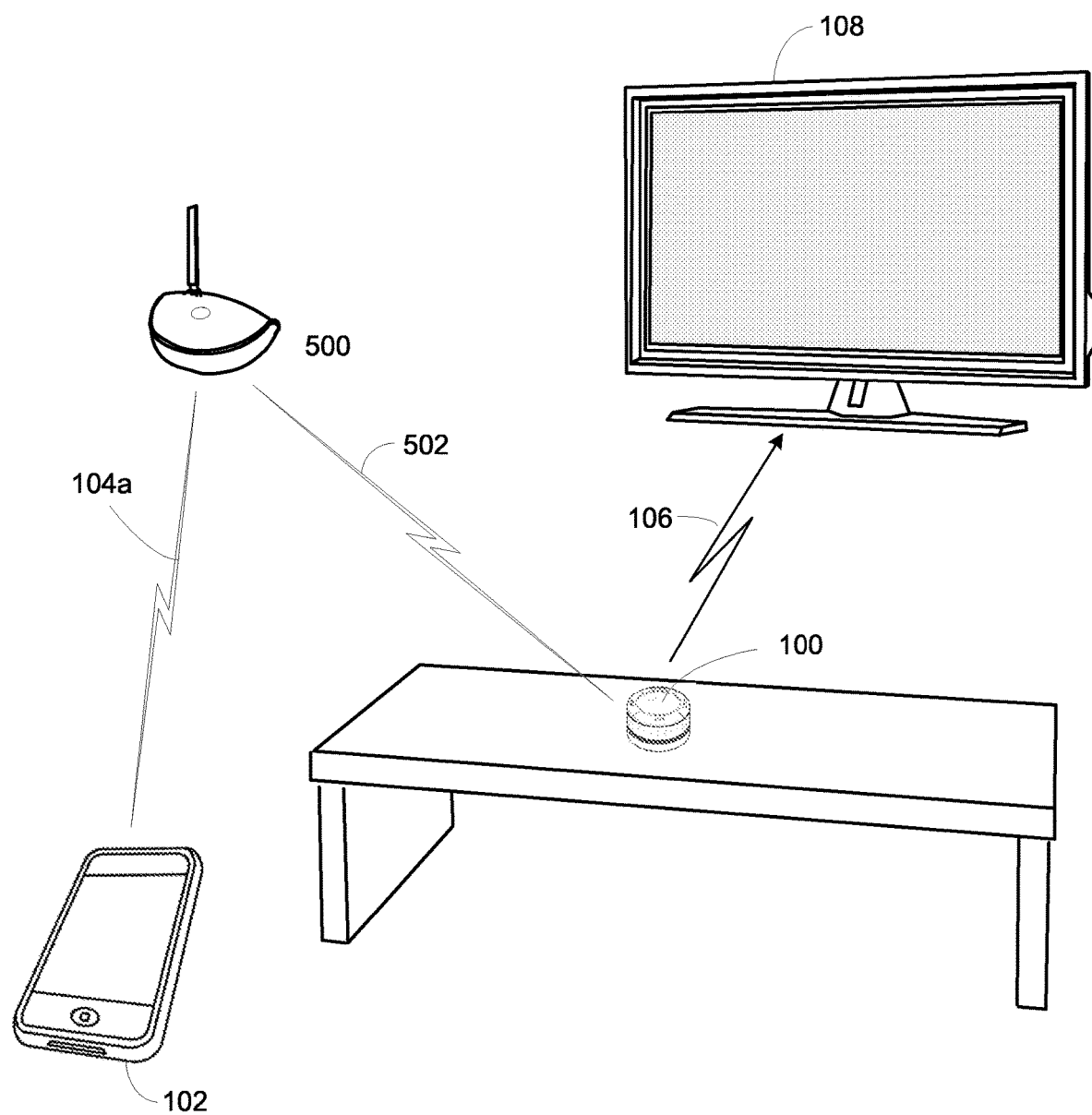
FIG. 5 illustrates a system incorporating an exemplary alternate embodiment of a bridge device in accordance with the instant invention.

With reference to FIG. 5, in certain cases a bridge device 100 may not have a wireless communication protocol in common with smart phone 102, for example and without limitation bridge device 100 may support only RF4CE and/or Bluetooth communication while smart phone 102 supports only WiFi local communication. In such instances, an intermediary device 500 may serve to receive wireless signals 104*a* comprising command requests from smart phone 102 and retransmit these command requests in a format which is compatible with a communication protocol supported by bridge device 100. As will be appreciated, though illustrated in the form of wireless transmission 502, in general such retransmission may take any form appropriate for a particular embodiment of bridge device 100: RF, IR, ultrasonic, hardwired, etc. Also, the functionality of intermediary device 500 may reside in a standalone unit provisioned expressly for this purpose, or may be incorporated in some other item of equipment, for example DVR 114.

Figure 6:
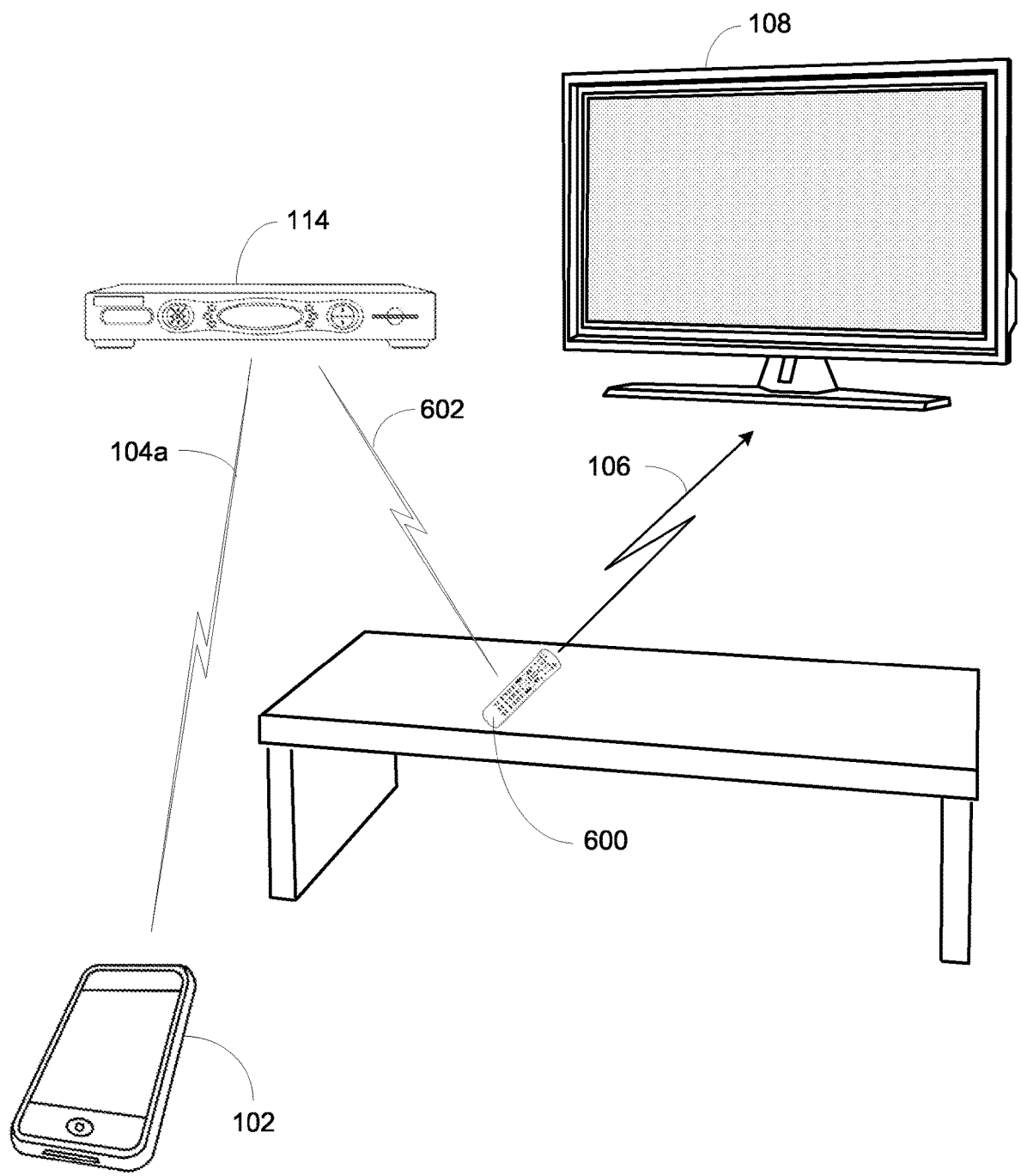
FIG. 6 illustrates a system incorporating a yet further exemplary alternate embodiment of a bridge device in accordance with the instant invention.

As illustrated in FIG. 6, in a yet further embodiment a remote control 600 which is capable of two-way communication 602 with a STB or DVR 114 via any convenient protocol such as for example RF4CE or XMP may also serve as a bridge device when equipped with appropriate programming. In such an application, STB or DVR 114 may act as an intermediary device in a similar manner to that described above, receiving command requests from smart phone 102 and relaying these to remote control 600 via two-way communication link 602. Programming in remote control 600 may perform as previously described to translate the received requests into command transmissions 106 in a format recognizable by an appliance to be controlled, for example TV 108. In some embodiments, the remote control 600 may be adapted to be placed into a recharging station. Such a remote control 600 may then be limited to serving as a bridge only when the remote control 600 is sensed to be placed into the docking station. Further, the docking station could be provided with the circuitry need to receive signals from an intermediary device with the docking station then functioning to relay any signals so received to a docked remote control 600, for example, transmitted via the charging contacts.

While various concepts have been described in detail, it will be appreciated by those skilled in the art that various modifications and alternatives to those concepts could be developed in light of the overall teachings of the disclosure. For example, in an alternate embodiment, a bridge device may be incorporated into some other item of equipment, for example a smart phone charging base, a portable keyboard or game controller device, a table lamp, etc.

Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A non-transitory, memory device having stored thereon instructions which instructions, when executed by a controlling device, cause the controlling device to respond to a first sensed event by transmitting to a media access device via use of a transmitting device of the controlling device a first command to cause a program guide to be displayed in a display associated with the media access device and by automatically transitioning the controlling device from a default command transmitting operational mode to a navigational command transmitting operational mode and to respond to a second sensed event by transmitting to the media access device via use of the transmitting device of the controlling device a second command to cause the media access device to commence a rendering on the display associated with the media access device a media selected on the displayed program guide at a time of the transmission of the second command and by automatically transitioning the controlling device from the navigational command transmitting operational mode back to the default command transmitting operational mode.

2. The non-transitory, memory device as recited in claim 1, wherein the default command transmitting operational mode comprises a mode for controlling at least volume operations of a one of the media access device and the display.

3. The non-transitory, memory device as recited in claim 1, wherein the first sensed event comprises a sensed user interaction with a guide launching input element of the controlling device.

4. The non-transitory, memory device as recited in claim 3, wherein the second sensed event comprises a sensed user interaction with a select input element of the controlling device.

5. The non-transitory, memory device as recited in claim 1, wherein the instructions comprise a remote control application configured on the controlling device to communicate commands directly to at least the media access device.

6. The non-transitory, memory device as recited in claim 5, wherein the media access device and the display associated with the media access device comprise a television.

7. The non-transitory, memory device as recite in claim 1, wherein the transmitting device comprises an infrared signal transmitting device.

8. The non-transitory, memory device as recited in claim 1, wherein the transmitting device comprises a radio frequency signal transmitting device.

9. The non-transitory, memory device as recited in claim 1, wherein the first sensed event comprises a sensing of a first command being received from a further controlling device in communication with the controlling device.

10. The non-transitory, memory device as recited in claim 9, wherein the second sensed event comprises a sensing of a second command being received from a further controlling device in communication with the controlling device.

11. A method performed by a controlling device, comprising:
responding to a first sensed event by transmitting to a media access device via use of transmitting device of the controlling device a first command to cause a program guide to be displayed in a display associated with the media access device and by automatically transitioning the controlling device from a default command transmitting operational mode to a navigational command transmitting operational mode; and
responding to a second sensed event by transmitting to the media access device via use of a transmitting device of the controlling device a second command to cause the media access device to commence a rendering on the display associated with the media access device a media selected on the displayed program guide at a time of the transmission of the second command and by automatically transitioning the controlling device from the navigational command transmitting operational mode back to the default command transmitting operational mode.

12. The method as recited in claim 11, wherein the default command transmitting operational mode comprises a mode for controlling at least volume operations of a one of the media access device and the display.

13. The method as recited in claim 11, wherein the first sensed event comprises a sensed user interaction with a guide launching input element of the controlling device.

14. The method as recited in claim 13, wherein the second sensed event comprises a sensed user interaction with a select input element of the controlling device.

15. The method as recited in claim 11, wherein the media access device and the display associated with the media access device comprise a television.

16. The method as recite in claim 11, wherein the transmitting device comprises an infrared signal transmitting device.

17. The method as recited in claim 11, wherein the transmitting device comprises a radio frequency signal transmitting device.

18. The method as recited in claim 11, wherein the first sensed event comprises a sensing of a first command being received from a further controlling device in communication with the controlling device.

19. The method as recited in claim 18, wherein the second sensed event comprises a sensing of a second command being received from a further controlling device in communication with the controlling device.

* * * * *